United States Patent
Hu et al.

(10) Patent No.: US 11,147,103 B2
(45) Date of Patent: Oct. 12, 2021

(54) RANDOM ACCESS METHOD, NETWORK DEVICE, AND USER EQUIPMENT

(71) Applicant: Huawei Technologies Co., Ltd., Shenzhen (CN)

(72) Inventors: Xingxing Hu, Shanghai (CN); Tianle Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/402,021

(22) Filed: May 2, 2019

(65) Prior Publication Data

US 2019/0261429 A1 Aug. 22, 2019

Related U.S. Application Data

(63) Continuation of application No. PCT/CN2017/109463, filed on Nov. 6, 2017.

(30) Foreign Application Priority Data

Nov. 4, 2016 (CN) .......................... 201610963821.4

(51) Int. Cl.
*H04W 68/00* (2009.01)
*H04W 76/11* (2018.01)
(Continued)

(52) U.S. Cl.
CPC ... *H04W 74/0833* (2013.01); *H04W 36/0055* (2013.01); *H04W 68/005* (2013.01);
(Continued)

(58) Field of Classification Search
CPC . H04W 74/0833; H04W 76/11; H04W 76/27; H04W 68/005; H04W 72/046
See application file for complete search history.

(56) References Cited

U.S. PATENT DOCUMENTS

2010/0189071 A1* 7/2010 Kitazoe ............... H04W 74/002
370/331
2012/0140740 A1 6/2012 Iwamura et al.
(Continued)

FOREIGN PATENT DOCUMENTS

CN 102291845 A 12/2011
CN 102484832 A 5/2012
(Continued)

OTHER PUBLICATIONS

Ericsson, "PRACH resource allocation for MTC," 3GPP TSG RAN WG1 Meeting #82, R1-153738, Beijing, China, Aug. 24-28, 2015, 3 pages.

*Primary Examiner* — Kevin C. Harper
*Assistant Examiner* — Derrick V Rose
(74) *Attorney, Agent, or Firm* — Slater Matsil, LLP

(57) ABSTRACT

Embodiments of this application disclose a random access method. The method includes: obtaining, by a first network device, resource information corresponding to a target service unit, where the resource information is used to indicate a resource to be used, by a user equipment (UE) that has established a connection to the first network device, to send a physical random access channel (PRACH) via the target service unit, and the target service unit is a cell to be accessed by the UE or at least one beam to be accessed by the UE; and sending, by the first network device, a notification message to the UE, where the notification message includes the resource information.

20 Claims, 3 Drawing Sheets

(51) Int. Cl.
*H04W 76/27* (2018.01)
*H04W 74/08* (2009.01)
*H04W 72/04* (2009.01)
*H04W 36/00* (2009.01)
*H04W 74/00* (2009.01)

(52) U.S. Cl.
CPC .......... *H04W 72/046* (2013.01); *H04W 76/11* (2018.02); *H04W 76/27* (2018.02); *H04W 74/002* (2013.01)

(56) References Cited

U.S. PATENT DOCUMENTS

| | | |
|---|---|---|
| 2013/0083774 A1 | 4/2013 | Son et al. |
| 2013/0279477 A1* | 10/2013 | Yang ................. H04W 36/0072 370/331 |
| 2014/0086213 A1 | 3/2014 | Kwon et al. |
| 2015/0181485 A1 | 6/2015 | Son et al. |
| 2016/0057783 A1 | 2/2016 | Rosa et al. |
| 2016/0249269 A1 | 8/2016 | Niu et al. |
| 2017/0078933 A1* | 3/2017 | Li ..................... H04W 36/0077 |
| 2017/0289867 A1* | 10/2017 | Fan ................... H04W 36/0072 |
| 2018/0084473 A1 | 3/2018 | Nagaraja et al. |
| 2018/0192347 A1* | 7/2018 | Shaheen ........... H04W 36/0077 |
| 2018/0288675 A1* | 10/2018 | Gunnarsson .......... H04W 48/04 |
| 2018/0332520 A1* | 11/2018 | Cheng ............... H04W 36/0058 |

FOREIGN PATENT DOCUMENTS

| | | |
|---|---|---|
| CN | 103037441 A | 4/2013 |
| CN | 103716895 A | 4/2014 |
| CN | 103828257 A | 5/2014 |
| CN | 104202779 A | 12/2014 |
| CN | 104956606 A | 9/2015 |
| CN | 105830496 A | 8/2016 |
| CN | 105900487 A | 8/2016 |
| EP | 1216524 B1 | 7/2008 |
| JP | 4337007 B1 | 9/2009 |
| JP | 2014531852 A | 11/2014 |
| JP | 2019532570 A | 11/2019 |
| RU | 2232469 C2 | 7/2004 |
| WO | 2015135203 A1 | 9/2015 |
| WO | 2018053093 A1 | 3/2018 |

* cited by examiner

RANDOM ACCESS METHOD, NETWORK DEVICE, AND USER EQUIPMENT

CROSS-REFERENCE TO RELATED APPLICATIONS

This application is a continuation of International Application No. PCT/CN2017/109463, filed on Nov. 6, 2017, which claims priority to Chinese Patent Application No. 201610963821.4, filed on Nov. 4, 2016. The disclosures of the aforementioned applications are hereby incorporated by reference in their entireties.

TECHNICAL FIELD

This application relates to the communications field, and more specifically, to a random access method, a network device, and user equipment.

BACKGROUND

In a current communications system, when a user equipment (UE) enters a connected state from an idle state or the UE is handed over from one cell to another cell, the UE needs to send a physical random access channel (PRACH) to implement random access. Therefore, the UE needs to learn of a time-frequency resource to be used for sending the PRACH.

In a current system, resources configured for the UE in the idle state are fixed. The resources configured for the UE in the idle state usually cannot be used by the UE to transmit data. To improve resource utilization, a network device selects, as the time-frequency resource to be used for the UE to send the PRACH, some or all of the resources configured for the UE in the idle state. Specifically, the network device may notify the UE of the time-frequency resource via a broadcast message. Then, the UE may perform random access when the time-frequency resource arrives. However, when the UE in the connected state performs random access, the UE probably needs to wait a very long time for the time-frequency resource indicated in the broadcast message, causing a relatively long random access delay of the UE in the connected state.

SUMMARY

Embodiments of this application provide a random access method, a network device, and user equipment, to reduce a random access delay of UE in a connected state.

According to a first aspect, a random access method is provided. The method includes obtaining, by a first network device, resource information corresponding to a target service unit, where the resource information is used to indicate a resource to be used, by a user equipment (UE) that has established a connection to the first network device, to send a physical random access channel (PRACH) via the target service unit, and the target service unit is a cell to be accessed by the UE or at least one beam to be accessed by the UE. The method also includes sending, by the first network device, a notification message to the UE, where the notification message includes the resource information.

Therefore, the first network device may notify, by sending the notification message to the user equipment, of the resource that can be used by the UE in a connected state to send the PRACH, so that the user equipment may use a resource allocated to the UE in the connected state, to send the PRACH, instead of waiting for a resource, delivered in a broadcast message to the UE in an idle state, for sending the PRACH. In this way, a random access delay of the UE in the connected state is reduced.

The resource information may include time domain resource information and frequency domain resource information, and correspondingly, the resource information is used to indicate a time domain resource and a frequency domain resource to be used, by the UE that has established a connection to the first network device, to send the PRACH via the target service unit; or the resource information may include time domain resource information, and correspondingly, the resource information is used to indicate a time domain resource to be used, by the UE that has established a connection to the first network device, to send the PRACH via the target service unit.

It needs to be noted that the target service unit is a service unit of a network device, and may be a cell or at least one beam. The UE may access the network device via the target service unit. The resource information is resource information for the target service unit, and may be per cell or may be per beam.

In this implementation, the notification message may be an existing message, such as a Media Access Control (MAC) CE message, a physical layer (PHY) message, a Radio Resource Control (RRC) message, or another downlink control message (for example, an RRC reconfiguration message) that may include the resource information. A property of the resource information is added to the message, so that the message has a function of notifying the UE of the time-frequency resource.

Optionally, the first network device may send the notification message via a dedicated channel of the UE, and in this case, the notification message may not include identifier information of the UE; or may send the notification message via a common channel, and in this case, the notification message includes identifier information of the UE.

In some possible implementations, the sending, by the first network device, a notification message to the UE includes: sending, by the first network device, a downlink control message to the UE, where the downlink control message includes the resource information.

Optionally, the downlink control message may be an existing message (for example, an RRC reconfiguration message). Related indication information is added to the existing message to carry the function.

In some possible implementations, the UE currently accesses a first service unit of the first network device, the target service unit is a second service unit of a second network device, and the obtaining, by a first network device, resource information corresponding to a target service unit includes: sending, by the first network device, a resource request message to the second network device, where the resource request message includes an identifier of the second service unit, the resource request message is used to request a resource to be used by the UE to send the PRACH via the second service unit, and the PRACH is used to hand over the UE from the first service unit to the second service unit; and receiving, by the first network device, a resource response message from the second network device, where the resource response message includes the resource information.

It needs to be noted that the UE needs to be handed over from the first service unit of the first network device to the second service unit of the second network device in this implementation. Therefore, the UE needs to obtain information about a resource that corresponds to the second service unit and that is allocated by the second network device to the UE.

Optionally, the resource request message may include the identifier of the second service unit, or may further include information such as a quantity of beam sweeping times of the UE.

Optionally, the resource response message may further include information, such as a C-RNTI and a size of a window for receiving a random access response RAR message.

In some possible implementations, the notification message is a Media Access Control (MAC) control element (CE) message, a PHY message, an RRC message, or dedicated signaling for the UE.

In some possible implementations, the resource information includes information about a resource that is required for the UE to send a preamble of the PRACH via the at least one beam.

In some possible implementations, the UE currently accesses a first beam of the first network device, the target service unit is a second beam of the first network device, and the PRACH is used to hand over the UE from the first beam to the second beam.

According to a second aspect, a random access method is provided. The method includes receiving, by a second network device, a resource request message from a first network device, where the resource request message is used to request a resource to be used by a user equipment UE to send physical random access channel (PRACH). The first network device is a device that has established a connection to the UE, the PRACH is used to hand over the UE from the first network device to the second network device, the resource request message includes an identifier of a target service unit, the target service unit is a service unit of the second network device, and the target service unit is a cell to be accessed by the UE in the second network device or at least one beam to be accessed by the UE in the second network device. The method also includes sending, by the second network device, a resource response message to the first network device, where the resource response message includes resource information of the target service unit, and the resource information indicates a resource to be used by the UE to send the PRACH via the target service unit.

With reference to the second aspect, in a first implementation of the second aspect, the resource information includes information about a resource that is required for the UE to send a preamble of the PRACH via the at least one beam.

In some possible implementations, the resource request message further includes a quantity of beam sweeping times of the UE, and the quantity of beam sweeping times is used to determine a size of the resource.

In some possible implementations, the method further includes: sending, by the second network device, an RAR message via the target service unit, where a physical downlink control channel (PDCCH) corresponding to the RAR message is scrambled with a random access radio network temporary identifier (RA-RNTI) or is scrambled with a cell radio network temporary identifier (C-RNTI).

In some possible implementations, the RA-RNTI is determined based on at least one of the following parameters: a subframe position, a symbol position, and a frequency domain position of a preamble of the physical downlink control channel (PDCCH) corresponding to the RAR message, a beam identifier (ID), a transmission reception point ID, and a port ID.

In some possible implementations, the resource request message further includes a quantity of beam sweeping times of the UE, and the quantity of beam sweeping times is used to determine a size of the resource.

According to a third aspect, a random access method is provided. The method includes receiving, by a user equipment UE, a notification message sent by a first network device that has established a connection to the UE, where the notification message includes resource information corresponding to a target service unit, the resource information indicates a resource to be used by the UE to send a physical random access channel (PRACH) via the target service unit, and the target service unit is a cell to be accessed by the UE or at least one beam to be accessed by the UE. The method also includes sending, by the UE, the PRACH via the target service unit by using the resource.

In some possible implementations, the method further includes: receiving, by the UE, a random access response (RAR) message via the target service unit, where a physical downlink control channel (PDCCH) corresponding to the RAR message is scrambled with a random access radio network temporary identifier (RA-RNTI) or is scrambled with a cell radio network temporary identifier (C-RNTI).

In some possible implementations, the RA-RNTI is determined based on at least one of the following parameters: a subframe location, a symbol location, and a frequency domain position at which the UE sends a preamble of the PRACH, a beam identifier (ID), a transmission reception point ID, and a port ID.

In some possible implementations, the UE currently accesses a first beam of the first network device, the target service unit is a second beam of a second network device, and the method further includes: receiving, by the UE, the RAR message via the first beam.

In some possible implementations, the receiving, by a user equipment (UE), a notification message sent by a first network device that has established a connection to the UE includes: receiving, by the UE, a downlink control message sent by the first network device, where the downlink control message includes the resource information.

According to a fourth aspect, a network device is provided, configured to perform the method in any one of the first aspect or the possible implementations of the first aspect. Specifically, the network device may include units configured to perform the method in any one of the first aspect or the possible implementations of the first aspect.

According to a fifth aspect, a network device is provided, configured to perform the method in any one of the second aspect or the possible implementations of the second aspect. Specifically, the network device may include units configured to perform the method in any one of the second aspect or the possible implementations of the second aspect.

According to a sixth aspect, user equipment is provided, configured to perform the method in any one of the third aspect or the possible implementations of the third aspect. Specifically, the user equipment may include units configured to perform the method in any one of the third aspect or the possible implementations of the third aspect.

According to a seventh aspect, a network device is provided, including a memory and a processor. The memory is configured to store an instruction. The processor is configured to execute the instruction stored in the memory. The execution of the instruction stored in the memory enables the network device to perform the method in any one of the first aspect or the possible implementations of the first aspect.

According to an eighth aspect, a network device is provided, including a memory and a processor. The memory is configured to store an instruction. The processor is configured to execute the instruction stored in the memory. The execution of the instruction stored in the memory enables the network device to perform the method in any one of the second aspect or the possible implementations of the second aspect.

According to a ninth aspect, user equipment is provided, including a memory and a processor. The memory is configured to store an instruction. The processor is configured to execute the instruction stored in the memory. The execution of the instruction stored in the memory enables the user equipment to perform the method in any one of the third aspect or the possible implementations of the third aspect.

According to a tenth aspect, a computer readable storage medium is provided, configured to store a computer program, where the computer program includes an instruction used to perform the method in any one of the first aspect to the third aspect or the possible implementations of the first aspect to the third aspect.

Based on the foregoing technical solutions, the first network device that has established a connection to the user equipment notifies, by sending the notification message to the user equipment, the user equipment of the resource to be used for sending the physical random access channel (PRACH), so that the user equipment can send the PRACH by using the resource. Therefore, in the random access method in the embodiments of this application, the user equipment may implement random access by using a resource available to the user equipment in a connected state, instead of waiting for a resource indicated in a broadcast message. In this way, a random access delay of the user equipment in the connected state is reduced.

DETAILED DESCRIPTION OF ILLUSTRATIVE EMBODIMENTS

It should be understood that technical solutions of this application may be applied to various communications systems, such as a Long Term Evolution (LTE) system, a Long Term Evolution Advanced (LTE-A) system, and a New Radio (NR) system, for example, a 5G system.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification indicates an "or" relationship between the associated objects.

It should be understood that the terms "first", "second", and the like in the embodiments of this application are only intended to distinguish different description objects, but do not represent an execution order or advantages or disadvantages of the description objects, and shall not be construed as any limitation on the embodiments of this application.

It should be understood that "a plurality of" appearing in the embodiments of this application represents two or more.

It should be understood that "network" and "system" appearing in the embodiments of this application express a same concept, and a communications system is a communications network.

Figure 1:
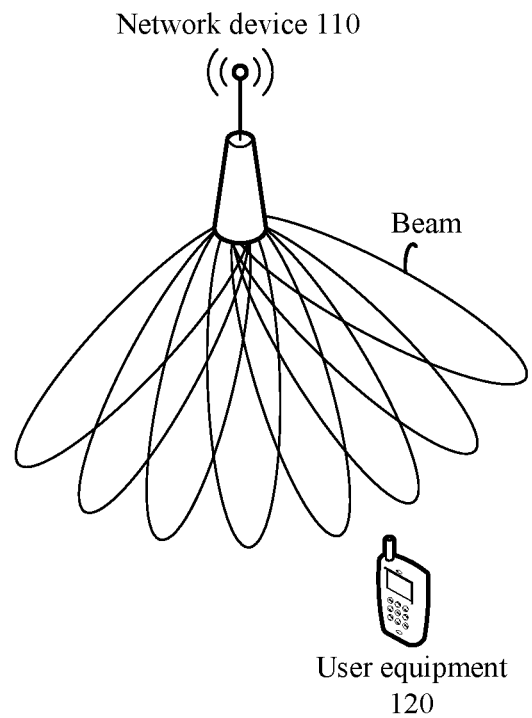
FIG. 1 is a schematic diagram of a wireless communications system according to an embodiment of this application.

FIG. 1 shows a radio communications system too according to an embodiment of this application. The radio communications system too may include at least one network device, for example, a network device 110 in FIG. 1. The network device 110 may provide communications coverage for a specific geographical area, and may communicate with user equipment located in the coverage area. The network device 110 may be an evolved NodeB (eNB, or eNodeB) in an LTE system, or a network device in a future 5G network, such as a transmission reception point (TRP), a base station, or a small cell device. This is not specifically limited in this embodiment of this application.

The radio communications system too further includes one or more user equipment 120 located in the coverage area of the network device 110. The user equipment 120 may be mobile or fixed. The user equipment 120 may communicate with one or more core networks (CN) through a radio access network (RAN). The user equipment may be referred to as an access terminal, a terminal device, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in the future 5G network, or the like.

In the radio communications system too, a radio coverage area of the network device 110 in a high frequency band may be improved based on a beam that has a high antenna gain and that is formed by a plurality of antennas. It may be understood that the beam in this embodiment of this application includes a transmit beam or a receive beam, and is a radio wave that has a specific direction and a specific shape in space and that is formed when at least one antenna port transmits or receives a radio signal. It can be learned that a beam has a specific coverage area. A beam forming method may include: weighting an amplitude and/or a phase of data that is transmitted or received by at least one antenna port, to form a beam. Alternatively, another method may be used. For example, a beam is formed by adjusting a related parameter of an antenna unit. This is not specifically limited in this embodiment of this application.

In a 5G system, a base station may include one or more transmission reception points (TRPs). The network device 110 may be one of the TRPs. Each TRP may cover one or more directions at a moment through beam sweeping. Optionally, the UE may receive data through beam sweeping, to improve a reception gain.

The network device and the UE may establish a connection to each other in the following manner. For each beam, the network device periodically sends a reference signal (RS), synchronization information, and other information like system broadcast information. In other words, the network device sends public information of each beam in a time division manner. This process is referred to as beam sweeping. Correspondingly, the UE obtains access information of each beam on a network device side based on the foregoing information, and the UE may perform random access by selecting one or more beams. The selected beam may be referred to as a serving beam. The UE may send a PRACH via the serving beam to access the network device. Therefore, the UE needs to learn of a resource to be used for sending the PRACH via the serving beam.

Optionally, to enable the network device to learn of a specific beam in which a signal of the UE is received with a better receiving effect, or to enable the UE to determine a specific beam of the UE in which a signal is sent with a better sending effect, the UE may also initiate a beam sweeping process. Therefore, the resource to be used by the UE to send the PRACH may also be related to beam sweeping information of the UE.

For ease of understanding the embodiments of this application, relationships between a base station, a cell, a transmission reception point, and a beam are briefly described before a random access method in an embodiment of this application is described.

In a radio communications system, a cell may be understood as an area covered by a radio signal of a base station, an area that can be covered by a radio signal of one base station may include one or more cells, one base station may include one or more TRPs, and each TRP includes one or more beams. When one base station includes only one cell, it may be considered that one cell includes a plurality of TRPs.

It should be understood that a beam or a cell is associated with a network device transmitting a radio signal. For example, one network device may manage at least one transmit beam or receive beam. For another example, one network device may manage at least one cell. For ease of description, in the embodiments of this application, the foregoing association relationship may be described in the following manner. For example, a first cell belongs to a first network device, or a network device to which a first cell belongs is a first network device, or a first cell is of a first network device. The foregoing description manners may be understood as a same meaning: An area that can be covered by a signal of the first network device includes one or more cells, and the first cell is one of the cells. The foregoing description manners are also applicable to a case of a beam.

It needs to be noted that, in the embodiments of this application, UE in a connected state may also be understood as that the UE has established a Radio Resource Control (RRC) connection to a network device.

Figure 2:
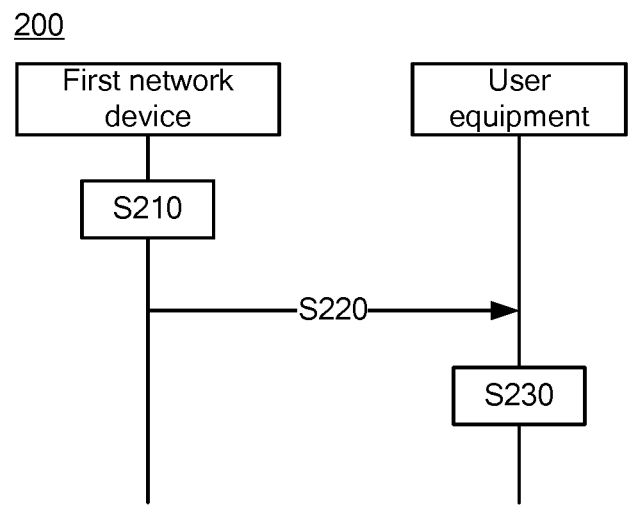
FIG. 2 is a schematic flowchart of a random access method according to an embodiment of this application.

The following describes in detail the random access method in the embodiments of this application with reference to FIG. 2.

It should be understood that FIG. 2 is a schematic flowchart of a random access method according to an embodiment of this application, and shows detailed communication blocks or operations of the method. However, these blocks or operations are only an example. Another operation or a variant of each operation in FIG. 2 may be performed in this embodiment of this application. In addition, blocks in FIG. 2 to FIG. 4 may be performed in an order different from that presented in FIG. 2, and not all the operations in FIG. 2 may be performed.

FIG. 2 is a schematic flowchart of a random access method 200, described from a perspective of device interaction, according to an embodiment of this application. The method 200 may be applied to a radio communications system, and the radio communications system may include at least one network device and at least one user equipment. For example, the radio communications system may be the radio communications system 100 shown in FIG. 1.

Optionally, the network device may be a TRP, a base station, or another network device that can send downlink control information (DCI). This is not specifically limited in this application.

Without loss of generality, the method 200 is described below in detail by using an example interaction between a first network device (marked as a first network device for ease of distinguishing and description) and user equipment in wireless coverage of the first network device.

As shown in FIG. 2, the method 200 includes the following blocks.

S210: The first network device obtains resource information corresponding to a target service unit, where the resource information is used to indicate a resource to be used, by a UE that has established a connection to the first network device, to send a PRACH via the target service unit, and the target service unit is a cell to be accessed by the UE or at least one beam to be accessed by the UE.

It needs to be noted that the target service unit is a cell to be accessed by the UE or at least one beam to be accessed by the UE. To be specific, the target service unit may be a cell or at least one beam to which the UE is to be handed over, or a cell or at least one beam to be re-accessed by the UE. To access the target service unit, the UE needs to send a PRACH via the target service unit. Therefore, the resource information corresponding to the target service unit may be understood as the resource to be used by the UE to send the PRACH via the target service unit.

The resource information may include time domain resource information and frequency domain resource information. Correspondingly, the resource information is used to indicate a time domain resource and a frequency domain resource (for ease of description, the "time domain resource and frequency domain resource" is referred to as a "time-frequency resource" for short below) to be used, by the UE that has established a connection to the first network device, to send the PRACH via the target service unit.

Alternatively, the resource information may include time domain resource information. Correspondingly, the resource information is used to indicate a time domain resource to be used, by the UE that has established a connection to the first network device, to send the PRACH via the target service unit. In other words, the UE may obtain a fixed frequency domain resource in advance, and the first network device only needs to notify the UE of an available time domain resource.

It should be understood that the resource in this embodiment of this application may also be referred to as a transmission resource, and may be used to carry data or signaling in an uplink communication process or in a downlink communication process. Particularly, the sending the PRACH by the UE may include: sending, by the UE, a preamble sequence on the PRACH, or sending, by the UE, other information that can be used for random access on the PRACH. Therefore, the resource to be used by the UE to send the PRACH includes a resource to be occupied on the PRACH to send the preamble sequence by the UE, or a resource to be occupied on the PRACH to send the other information used for random access by the UE Specifically, a time domain resource including a specific quantity of symbols (symbol) may be occupied for the UE to send the PRACH. In other words, the time domain resource information is per symbol. Alternatively, the time domain resource information may be per transmission time interval (TTI). This is not limited in this embodiment of this application.

The random access method provided in this embodiment of this application is described below by using an example in which the resource information includes time-frequency resource information. To be specific, the resource information indicates a time-frequency resource to be used by the UE to send the PRACH via the target service unit. It may be understood that various technical solutions provided in the embodiments of this application are applicable to the foregoing scenario in which the resource information includes only the time domain resource information. Details are not described again.

Specifically, the UE is one user equipment in a radio coverage area of the first network device, and the UE has established an RRC connection to the first network device. The UE may initiate a random access process in the following cases: The UE needs to be handed over from a cell or at least one beam of the first network device to a cell or at least one beam of a second network device, for example, the UE needs to be handed over from a first cell in the first network device to a second cell in the second network device, or the UE needs to be handed over from the at least one beam of the first network device to the at least one beam of the second network device. Alternatively, the UE has currently accessed the first network device, and uplink data or downlink data arrives but an uplink is in an "out-of-synchronization" state, in other words, the UE needs to re-access a cell or at least one beam of the first network device. Alternatively, the UE needs to be handed over from a cell or a beam of the first network device to another cell or another beam of the first network device, for example, the UE needs to be handed over from a first beam of the first network device to a second beam of the first network device, and the first beam and the second beam may be beams of a same TRP in a same cell, may be beams of different TRPs in a same cell, or may be beams in different cells of the first network device.

Optionally, before S210, the method further includes: sending, by the UE, a resource request message to the first network device, where the resource request message is used to request the UE to access the second network device.

Therefore, after receiving the resource request message sent by the UE, the first network device may obtain the resource information corresponding to the target service unit, for example, request the second network device to allocate a time-frequency resource to the UE, and send the obtained resource information to the UE.

Specifically, the resource request message may be included in a scheduling request (SR) or in an access request. The access request may be a preamble.

It should be understood that the random access method in this embodiment of this application may be applicable to another scenario, such as a scenario in which the UE currently exists in a third state and needs to initiate a random access process to access a network device. The third state may be a state different from an idle state and a connected state.

Based on the foregoing scenario, the first network device needs to obtain information about the time-frequency resource allocated to the UE, and the time-frequency resource information indicates the time-frequency resource that is allocated to the UE and that is used to send the PRACH via the target service unit. When the UE needs to be handed over from the first cell in the first network device to the second cell of the second network device, and the target service unit is the second cell of the second network device, the time-frequency resource may be a time-frequency resource corresponding to the second cell. When the UE needs to be handed over from the first beam of the first network device to the second beam of the first network device, and the target service unit is the second beam of the first network device, the time-frequency resource may be a time-frequency resource corresponding to the second beam. Therefore, the time-frequency resource information may be per cell, or may be per beam.

In other words, when the target service unit that the UE needs to access is a cell, the allocated time-frequency resource is a time-frequency resource for the cell. When the target service unit that the UE needs to access is one or more beams, the allocated time-frequency resource is a time-frequency resource for the one or more beams, instead of a time-frequency resource for all beams of the cell.

Therefore, in this embodiment of this application, a corresponding time-frequency resource may be allocated based on a type of the target service unit to be accessed by the UE, thereby avoiding a problem of a waste of resources that is caused when a time-frequency resource for an entire cell is always allocated to the UE regardless of whether the UE needs to access the cell or a beam.

It should be understood that when the to-be-accessed cell includes only one beam, a time-frequency resource for the beam may be understood as a time-frequency resource for the cell.

It needs to be noted that when the UE needs to be handed over from the first cell to the second cell (the first cell and the second cell may be cells of a same network device, or may be cells of different network devices), the first cell and the second cell may be intra-frequency cells of a same standard, inter-frequency cells of a same standard, inter-frequency cells of different standards, or intra-frequency cells of different standards. This is not limited in this embodiment of this application.

S220: The first network device sends a notification message to the UE, where the notification message includes the time-frequency resource information, so that the UE sends the PRACH on the time-frequency resource.

Specifically, after obtaining the time-frequency resource that is required for the UE to send the PRACH, the first network device sends the notification message to the UE. The notification message includes information about the time-frequency resource. The UE may determine, based on the time-frequency resource information included in the notification message, the time-frequency resource indicated by the time-frequency resource information, and then send the PRACH on the time-frequency resource.

It needs to be noted that if the target service unit is a first service unit of the first network device, the time-frequency resource may be allocated by the first network device. Alternatively, if the target service unit is a second service unit of the second network device, the time-frequency resource may be allocated by the second network device.

It should be understood that the notification message may be a downlink control message of various types, such as a Media Access Control (MAC) control element (CE) message, a physical layer (PHY) message, or an RRC message (for example, an RRC reconfiguration message); or may be another downlink control message. Corresponding indication information is added to the message, so that the message has a function of notifying the UE of the time-frequency resource. Alternatively, the notification message may be a specially defined message used to notify the UE of the information about the allocated time-frequency resource. This is not limited in this embodiment of this application.

Optionally, the first network device may send the notification message via a dedicated channel of the UE, and in this case, the notification message may not include identifier information of the UE; or may send the notification message via a common channel, and in this case, the notification message includes identifier information of the UE.

Optionally, if the UE has a plurality of links, the plurality of links belong to different carriers or different communication standards, and at least one of the plurality of links is connected to the first network device, the first network device may send the notification message to the UE via any one of the plurality of links. For example, the UE has a first link and a second link, the first link is a link between the UE and a network device 1, and the second link is a link between the UE and a network device 2. Therefore, the network device 1 may send the notification message to the network device 2 in a manner of inter-network-device communication (for example, X2 interface communication), and the network device 2 sends the notification message to the UE via the second link. For another example, a high-frequency link and a low-frequency link exist between the UE and a network device 1, and the notification message is control information of the high-frequency link. Therefore, the network device 1 may send the notification message to the UE via the low-frequency link. This is not specifically limited in this embodiment of this application.

Optionally, the notification message may further include a preamble identifier (Preamble ID) of the PRACH. The preamble ID is a preamble sequence to be used by the UE to send the PRACH on the time-frequency resource. Because each UE has a different preamble ID, different UEs may be distinguished from each other based on preamble IDs. Therefore, after receiving the preamble sequence, the target service unit may determine, based on the preamble sequence, specific UE that will send the PRACH via the target service unit, thereby avoiding a problem that a plurality of UEs contend with each other to initiate a random access process, and avoiding a problem that an access delay increases when a plurality of UEs use a same preamble ID and subsequently a message needs to be further sent to indicate which UE has sent the preamble ID.

S230: The UE sends the PRACH via the target service unit by using the time-frequency resource.

Specifically, after receiving the notification message, the UE determines, based on the time-frequency resource information included in the notification message, the time-frequency resource to be used for sending the PRACH, and then sends the PRACH via the target service unit by using the time-frequency resource, so as to implement random access. Specifically, if the UE needs to be handed over from the first service unit of the first network device to the second service unit of the second network device, the time-frequency resource may be a time-frequency resource corresponding to the second service unit of the second network device, and the UE sends the PRACH on the time-frequency resource and accesses the second service unit of the second network device. If the UE needs to re-access the first service unit of the first network device, the time-frequency resource is a time-frequency resource corresponding to the first service unit of the first network device, and the UE sends the PRACH on the time-frequency resource and accesses the first service unit of the first network device.

Optionally, if the UE currently accesses the first service unit of the first network device, and the target service unit is the second service unit of the second network device, the time-frequency resource is allocated by the second network device and S210 may further specifically include: sending, by the first network device, a resource request message to the second network device, where the resource request message includes an identifier of the second service unit, the resource request message is used to request a time-frequency resource to be used by the UE to send the PRACH in the second service unit, and the PRACH is used to hand over the UE from the first service unit to the second service unit; and receiving, by the first network device, a resource response message from the second network device, where the resource response message includes the time-frequency resource information.

Specifically, when the UE needs to be handed over from the first service unit to the second service unit, the UE needs to send the PRACH via the second service unit of the second network device, so as to access the second service unit. Therefore, the UE first needs to obtain the time-frequency resource to be used for sending the PRACH. Optionally, the first network device may obtain, by sending the resource request message to the second network device, information about a time-frequency resource that is allocated by the second network device. The resource request message may include the identifier of the second service unit, and the second service unit may be a second cell of the second network device or a serving beam determined by the UE. Optionally, when the second service unit is the second cell, the identifier of the second service unit may be an identifier of the cell. When the second service unit is a plurality of beams, the identifier of the second service unit may be identifiers of the plurality of beams.

It needs to be noted that if the UE currently accesses a first beam and the target service unit is a second beam, when the first beam and the second beam belong to different cells, the resource request message further needs to include a cell identifier of a cell of which the second beam is located; or when the first beam and the second beam belong to a same cell, the resource request message may not include an identifier of the cell.

Optionally, the resource request message may further include information about a quantity of beam sweeping times of the UE (which may be understood as a quantity of beams used for communication between a UE side and a network device side). The information about the quantity of beam sweeping times may be used to determine a size of the time-frequency resource that is allocated to the UE to send the PRACH. If there is one beam on the network device side and a plurality of beams are included on the UE side, a corresponding time-frequency resource needs to be allocated to the plurality of beams, so as to send the PRACH on the beam on the network device side. When there is one beam on the network device side and there is also one beam on the UE side, the size of the time-frequency resource that is allocated to the UE is one time-frequency resource unit. When there is one beam on the network device side and there are n beams on the UE side (in other words, the quantity of beam sweeping times is n), the size of the time-frequency resource that is allocated to the UE is n time-frequency resource units. The time-frequency resource unit is a minimum granularity of the time-frequency resource that is allocated to the PRACH, for example, the time-frequency resource may be a resource block (RB) or the like. Assuming that the time-frequency resource unit is six RBs, when the quantity of beam sweeping times is 6, in other words, there are six beams on the UE side, the time-frequency resource needing to be allocated is 6×6 RBs.

It needs to be noted that the quantity of beam sweeping times may be a total quantity of beams that is determined by the UE based on a capability of the UE, or may be a quantity of beams that are selected on the UE side, from the total quantity of beams, based on quality of signal transmission between beams of the UE and the network device (which may be understood as a quantity of beams that are selected by the UE from the total quantity of beams and that have desirable quality of communication with a beam on a network side), or may be a quantity of beams that are selected on a network side, from the total quantity of beams, based on information such as a location of the UE.

Optionally, the first network device may trigger sending the resource request message in the following cases: The first network device receives a measurement result of the UE, where the measurement result indicates that the UE needs to be handed over from a first cell to a second cell; or the first network device determines, based on signal quality of the UE in a first cell and a second cell, that the UE needs to be handed over from the first cell to the second cell; or the first network device determines that network load of the first cell of the first network device exceeds a load threshold, and a cell handover needs to be performed.

It should be understood that the resource request message may be a specially defined message used to request the time-frequency resource. Alternatively, a related attribute for requesting the time-frequency resource information is added to an existing message (for example, a handover request message), and the attribute enables the message to have a function of requesting the time-frequency resource. This is not limited in this embodiment of this application.

After sending the resource request message to the second network device, the first network device receives a resource response message sent by the second network device. The resource response message is a response message for the resource request message, the resource response message includes the time-frequency resource information, and the time-frequency resource information indicates the time-frequency resource that is allocated by the second network device to the UE to send the PRACH.

Optionally, in another implementation of this application, when the second network device learns, through measurement, that the signal quality of the UE meets a preset condition, the second network device actively allocates a time-frequency resource to the first network device, and then the first network device can obtain the corresponding time-frequency resource without the need of sending the resource request message to the second network device. That the signal quality of the UE meets a preset condition may be that the signal quality of the UE is greater than a preset signal threshold, indicating that the signal quality of the UE is good enough to implement communication.

Optionally, when the target service unit is at least one beam, the time-frequency resource may include a time-frequency resource to be used by the UE to send the PRACH via the at least one beam. Specifically, if the at least one beam includes only one beam, the time-frequency resource may include a time-frequency resource for the beam. If the at least one beam includes a plurality of beams, the time-frequency resource may include a time-frequency resource allocated to the plurality of beams, or may include a time-frequency resource allocated to each of the plurality of beams. In other words, the time-frequency resource may include the time-frequency resource of one beam, or may include the time-frequency resource of a plurality of beams.

If the target service unit is a cell, the time-frequency resource may include a time-frequency resource to be used by the UE to send the PRACH via the cell.

Optionally, if the resource request message includes the information about the quantity of beam sweeping times of the UE, in other words, a plurality of beams are included on the UE side, a size of the time-frequency resource may be determined based on a quantity of beams on the network device side and a quantity of beams on the user equipment side. For example, when there is one beam on the network device side, and there is also one beam on the UE side, a time-frequency resource needing to be allocated is one time-frequency resource unit. Therefore, when the quantity of beams on the network device side is M, and the quantity of beams on the UE side is N, a size of the time-frequency resource needing to be allocated is M×N time-frequency resource units. In other words, a corresponding time-frequency resource needs to be allocated to each of the N beams on the UE side, so as to send the PRACH via each of the M beams on the network device side.

The following describes in detail specific information that may be specifically included in the time-frequency resource information.

The time-frequency resource information may include information about a time domain resource that is allocated to the UE and that is used to send a preamble for a plurality of times. The time domain resource information may be periodic or aperiodic. This is not limited in this embodiment of this application. In addition, the time domain resource information may be per TTI or per symbol. This is not specifically limited in this embodiment of this application.

The time-frequency resource information includes a time domain resource that is required to send a preamble for a plurality of times, thereby avoiding the following problem: Probably a preamble sent by the UE once cannot be received by a network device because transmit power of the UE is not large enough, causing a random access failure of the UE.

When the UE initiates a beam sweeping process (in other words, the UE includes a plurality of beams), the time-frequency resource information may further include information about a time domain resource that is allocated to the plurality of beams and that is used to send a preamble via the target service unit, and each of the plurality of beams may randomly use any segment of the time domain resource. Alternatively, the time domain resource information may include time domain resource information for each of the plurality of beams. In other words, the time domain resource information is for each beam. In this case, the preamble may be sent via each of the plurality of beams by using a time domain resource that is allocated to the beam. The time domain resource information may be consecutive (for example, the time domain resource information is several consecutive symbols or several consecutive TTIs), or may be inconsecutive.

Optionally, the time-frequency resource information may further include information about a frequency domain resource that is allocated to the UE and that is used to send a preamble. The frequency domain resource information indicates a frequency domain position at which the UE sends the preamble. If the UE needs to send the preamble for a plurality of times, the frequency domain resource information may include a frequency domain position at which the preamble is sent each time. Optionally, if the target service unit is a plurality of beams, the frequency domain resource information may include a frequency domain position at which the preamble is sent in each beam, and the like.

It should be understood that the frequency domain position at which the UE sends the preamble may be determined by using any method for determining the frequency domain position at which the preamble is sent. For example, the UE sends the preamble at a pre-agreed frequency domain position, and a network device receives the preamble at the agreed position. In this case, the resource response message may not include the frequency domain resource information, so that a size of the resource response message may be reduced. Alternatively, the UE may send the preamble at a specially defined frequency domain position. This is not limited in this embodiment of this application. Optionally, if the UE needs to send the preamble for a plurality of times, frequency positions at which the preamble is sent may be the same or different. If the frequency positions are the same, the size of the resource response message may be reduced to some extent.

It should be further understood that the foregoing description of allocation of the time-frequency resource for the PRACH per beam is only an example. This embodiment of this application is also applicable to allocation of the time-frequency resource for the PRACH at another granularity, for example, per TRP. In a broad sense, a cell may also be considered as a wide beam.

Optionally, the resource response message may further include a preamble ID, and the preamble ID is a preamble sequence to be used by the UE to send the PRACH on the time-frequency resource. Because a preamble ID of each UE is different, different UEs may be distinguished from each other based on preamble IDs. Therefore, after receiving the preamble sequence, the network device may determine, based on the preamble sequence, specific UE that will send a PRACH signal via the target service unit, thereby avoiding a problem that a plurality of UEs contend with each other to initiate a random access process, and avoiding a problem that an access delay increases when a plurality of UEs use a same preamble ID and subsequently a message needs to be further sent to indicate which UE has sent the preamble ID.

Optionally, the resource response message may further include window size information of a random access response (RAR) message. The RAR message is a response message for the UE sending the PRACH. The window size information indicates how long the UE will wait for a response from the network-side device after the UE sends the PRACH. In this embodiment of this application, a size of a window for receiving the RAR message may be the same as or different from RA-Response Window Size in the prior art (for example, a value of the window size may be 0). This is not specifically limited in this embodiment of this application.

Optionally, the resource response message may further include a cell radio network temporary identifier (C-RNTI). The C-RNTI may be used to indicate an RNTI of a PDCCH corresponding to an RAR message subsequently received by the UE via the target service unit. In this case, an RAR message feed backed by the second network device via the target service unit may also be scrambled with the C-RNTI, so that the RAR message does not need to include a preamble ID, sent by the UE, as an identifier of the UE. Therefore, a size of the RAR message is reduced.

Optionally, after S230, the method 200 may further include: receiving, by the UE, the RAR message via the target service unit.

Specifically, after sending the PRACH, the UE starts listening to an RAR message on a PDCCH from a third subframe, and a size of a listening window may be the window size, included in the resource response message, of the RAR message. If the UE receives the RAR message in the window for receiving the RAR message, it indicates that random access succeeds. If the UE does not receive the RAR message in the window for receiving the RAR message, the UE considers that the sent preamble has not been received by the network device.

It needs to be noted that, if the target service unit is the second service unit of the second network device, the UE receives the RAR message in the second service unit; or if the target service unit is the first service unit of the first network device, the UE may receive the RAR message via the first service unit of the first network device.

Particularly, if the target service unit is the second service unit of the second network device, the PDCCH corresponding to the RAR message may be sent by the second network device via the second beam (a beam of the second network device), or may be sent by the first network device via the first beam (a beam of the first network device). In this case, the UE does not need to listen to the RAR message via the second beam of the second network device (to be specific, the RAR message to be sent by the second network device is transferred, so that the RAR message is sent by the first network device to the UE; to enable the UE to determine a specific network device to which the RAR message belongs, identifier information of the second network device may be added to the RAR message, and is used to indicate the specific network device to which the RAR message belongs).

Optionally, when an RAR message of the second service unit is sent via the first service unit, the first network device or the second network device may add an identifier to the RAR message. The identifier is used to indicate that the RAR message corresponds to the second service unit. Specifically, the identifier may be the identifier of the second service unit.

Optionally, when a PDCCH message of the second service unit is sent via the first service unit, and the RAR message of the second service unit is still sent via the second service unit, the first network device may add the identifier of the second service unit to the PDCCH message that is sent via the first service unit, to instruct the UE to receive the RAR message via the second service unit.

The RAR message of the second service unit is an RAR message sent by the second service unit to the UE, to respond to a random access request of the UE.

Therefore, the second network device does not need to schedule the second beam for sending the RAR message, thereby improving resource utilization.

It should be understood that the foregoing manner of transferring the RAR message needing to be sent by the second network device so that the RAR message is sent by the first network device may also be applied to another scenario. For example, there are three devices (a first device, a second device, and a third device) in a radio communications system. The first device needs to send a first message to the third device. The first device may send the first message to the second device. Then the second device may send a second message to the third device. Data in the first message is carried in the second message, so as to transfer the first message to the third device. The second message further includes identifier information of the first device, to indicate that data in the second message is sent by the first device to the third device. Particularly, the first device and the second device may belong to different cells on a same frequency, or different cells on different frequencies; or may belong to a same cell (for example, different TRPs in a same cell), or different beams of a same TRP in a same cell. In addition, the first device, the second device, and the third device may be network-side devices, or may be user equipment. This is not limited in this embodiment of this application.

It needs to be noted that the response message for the UE sending the PRACH may be an RAR message, and may be sent to the UE via a data channel indicated by the PDCCH. The RAR message indicates that the UE has successfully sent the preamble. Alternatively, the response message for sending the PRACH may be scheduling information sent via the PDCCH (in other words, the network device does not need to send the RAR message). That the UE receives the scheduling information may be understood as that the network device has allocated, to the UE, a resource for transmitting uplink and downlink data. In other words, the UE has successfully sent the preamble.

Optionally, the PDCCH corresponding to the RAR message is scrambled with a random access radio network temporary identifier (RA-RNTI). The RA-RNTI is used to indicate that the RAR message on the PDCCH is the RAR message sent to the UE. In other words, the RA-RNTI may indicate that the RAR message is an RAR message of specific UE. The RA-RNTI may be determined based on at least one of the following parameters: a subframe position, a symbol position, and a frequency domain position of a preamble of the PDCCH corresponding to the RAR message, a beam identifier ID, a transmission reception point ID, and a port ID.

For example, the first network device includes three TRPs: a TRP 1, a TRP 2, and a TRP 3. The UE needs to be handed over from the TRP 1 to the TRP 2. The RA-RNTI may be determined based on a transmission reception point ID of the TRP 2 or a port ID of the TRP 2, so that the UE avoids incorrectly considering that the RAR message is sent by the TRP 3.

Alternatively, the PDCCH corresponding to the RAR message may be scrambled with a C-RNTI. The C-RNTI may be used to indicate that the RAR message is an RAR message of specific user equipment. In this case, the network device does not need to add a preamble ID that is sent by the UE, as the identifier of the UE, into the RAR message, thereby reducing a size of the RAR message.

Therefore, in the random access method in this embodiment of this application, in a connected state, the network device notifies, by sending the notification message to the UE, the UE of the resource to be used to send the PRACH, so that the UE may send the PRACH by using the resource in the connected state, instead of waiting for a resource indicated in a broadcast message. In this way, a random access delay of the UE in the connected state is reduced.

The foregoing has described in detail the random access method in the embodiment of this application with reference to FIG. 2. The following describes in detail random access apparatuses in the embodiments of this application with reference to FIG. 3 to FIG. 6.

Figure 3:
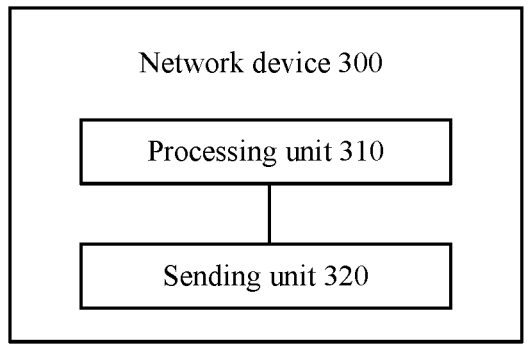
FIG. 3 is a schematic block diagram of a network device according to an embodiment of this application.

An embodiment of this application provides a network device. A schematic block diagram of the network device may be shown in FIG. 3. FIG. 3 is a schematic block diagram of a network device 300 according to an embodiment of this application. As shown in FIG. 3, the network device 300 includes: a processing unit 310 and a sending unit 320. The processing unit 310 may be configured to obtain resource information corresponding to a target service unit. The resource information is used to indicate a resource to be used, by user equipment UE that has established a connection to the network device, to send a physical random access channel PRACH via the target service unit, and the target service unit is a cell to be accessed by the UE or at least one beam to be accessed by the UE. The sending unit 320 may be configured to send a notification message to the UE. The notification message includes the resource information.

The resource information may include time domain resource information and frequency domain resource information, and correspondingly, the resource information is used to indicate a time domain resource and a frequency domain resource to be used, by the UE that has established a connection to the first network device, to send the PRACH via the target service unit. Alternatively, the resource information may include time domain resource information, and correspondingly, the resource information is used to indicate a time domain resource to be used, by the UE that has established a connection to the first network device, to send the PRACH via the target service unit.

Specifically, the network device 300 may correspond to the first network device in the random access method 200 in the embodiments of this application, and the network device 300 may include units configured to perform the method that is performed by the first network device in the method 200 in FIG. 2. In addition, the units and the foregoing operations and/or functions of the network device 300 are separately intended to implement corresponding processes of the method 200 in FIG. 2. For brevity, details are not described herein again.

Figure 4:
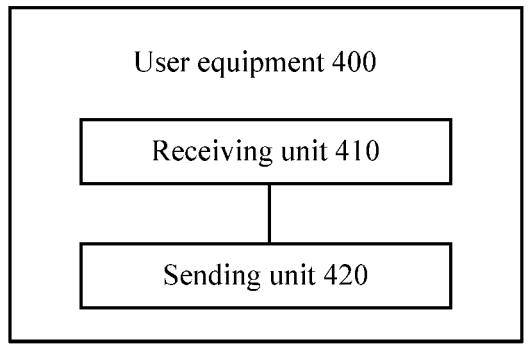
FIG. 4 is a schematic block diagram of user equipment according to an embodiment of this application.

An embodiment of this application provides user equipment. A schematic block diagram of the user equipment may be shown in FIG. 4. FIG. 4 is a schematic block diagram of user equipment 400 according to an embodiment of this application. As shown in FIG. 4, the user equipment 400 includes: a receiving unit 410 and a sending unit 420. The receiving unit 410 may be configured to receive a notification message sent by a first network device that has established a connection to the UE. The notification message includes resource information corresponding to a target service unit, the resource information indicates a resource to be used by the UE to send a physical random access channel PRACH via the target service unit, and the target service unit is a cell to be accessed by the UE or at least one beam to be accessed by the UE. The sending unit 420 may be configured to send the PRACH via the target service unit by using the resource.

Specifically, the user equipment 400 may correspond to the user equipment in the random access method 200 in the embodiments of this application, and the user equipment 400 may include units configured to perform the method that is performed by the user equipment in the method 200 in FIG. 2. The units and the foregoing operations and/or functions of the user equipment 400 are separately intended to implement corresponding processes of the method 200 in FIG. 2. For brevity, details are not described herein again.

Figure 5:
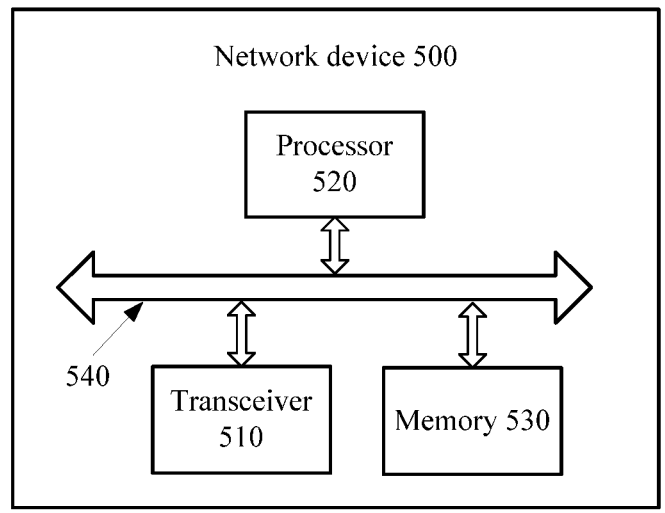
FIG. 5 is a schematic block diagram of a network device according to another embodiment of this application.

An embodiment of this application further provides a network device. A schematic block diagram of the network device may be shown in FIG. 5. FIG. 5 is a schematic block diagram of a network device 500 according to another embodiment of this application. As shown in FIG. 5, the network device 500 includes: a transceiver 510, a processor 520, a memory 530, and a bus system 540. The transceiver 510, the processor 520, and the memory 530 are connected by using the bus system 540. The memory 530 is configured to store an instruction. The processor 520 is configured to execute the instruction stored in the memory 530, to control the transceiver 510 to receive or send a signal. The memory 530 may be configured in the processor 520, or may be independent of the processor 520.

Optionally, the processor 520 may execute the instruction in the memory 530. The instruction may be used to obtain resource information corresponding to a target service unit. The resource information is used to indicate a resource to be used, by a user equipment (UE) that has established a connection to the network device, to send a physical random access channel PRACH via the target service unit. The target service unit is a cell to be accessed by the UE or at least one beam to be accessed by the UE.

Optionally, the processor 520 may control the transceiver 510 to send a notification message to the UE. The notification message includes the resource information.

Specifically, the network device 500 may correspond to the first network device in the random access method 200 in the embodiments of this application, and the network device 500 may include entity units configured to perform the method that is performed by the first network device in the method 200 in FIG. 2. The entity units and the foregoing operations and/or functions of the network device 500 are separately intended to implement corresponding processes of the method 200 in FIG. 2. For brevity, details are not described herein again.

Figure 6:
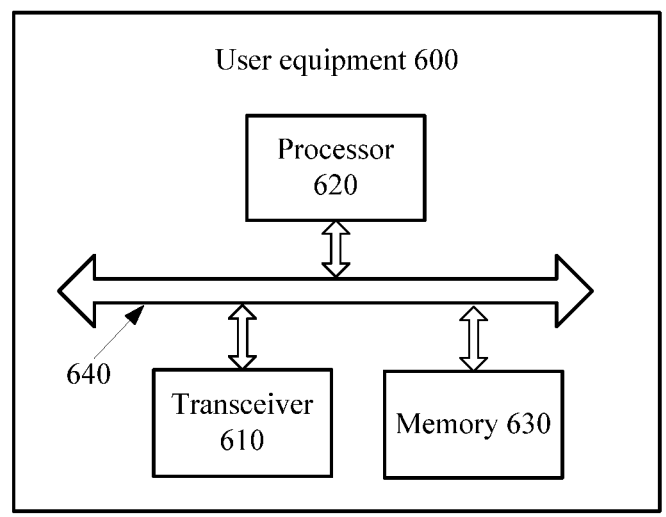
FIG. 6 is a schematic block diagram of user equipment according to another embodiment of this application.

An embodiment of this application further provides user equipment. A schematic block diagram of the user equipment may be shown in FIG. 6. FIG. 6 is a schematic block diagram of user equipment 600 according to another embodiment of this application. As shown in FIG. 6, the user equipment 600 includes: a transceiver 610, a processor 620, a memory 630, and a bus system 640. The transceiver 610, the processor 620, and the memory 630 are connected by using the bus system 640. The memory 630 is configured to store an instruction. The processor 620 is configured to execute the instruction stored in the memory 630, to control the transceiver 610 to receive or send a signal. The memory 630 may be configured in the processor 620, or may be independent of the processor 620.

Optionally, the processor 620 may control the transceiver 610 to receive a notification message sent by a first network device that has established a connection to the UE, where the notification message includes resource information corresponding to a target service unit, the target service unit is a cell to be accessed by the UE or at least one beam to be accessed by the UE, and the resource information indicates a resource to be used by the UE to send a physical random access channel PRACH via the target service unit; and further send the PRACH via the target service unit by using the resource.

Specifically, the user equipment 600 may correspond to the user equipment in the random access method 200 in the embodiments of this application, and the user equipment 600 may include entity units configured to perform the method that is performed by the user equipment in the method 200 in FIG. 2. In addition, the entity units and the foregoing operations and/or functions of the user equipment 6000 are separately intended to implement corresponding processes of the method 200 in FIG. 2. For brevity, details are not described herein again.

It should be understood that the processor in the embodiments of this application may be an integrated circuit chip, and has a signal processing capability. During implementation, each block in the foregoing method embodiment may be implemented by using an integrated logic circuit of hardware in the processor or an instruction in a form of software. The processor may be a central processing unit (CPU), or the processor may be another general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams disclosed in the embodiments of this application. The general purpose processor may be a microprocessor, or the processor may be any conventional processor, or the like. The blocks of the method disclosed with reference to the embodiments of this application may be directly embodied as being executed by a hardware decoding processor, or executed by a combination of hardware of a decoding processor and a software component. The software component may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the blocks in the foregoing method in combination with the hardware of the processor.

It should be further understood that the memory in the embodiments of this application may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAMs, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct Rambus random access memory (Direct Rambus RAM, DR RAM), may be used. It should be noted that the memory in the system and method described in this specification is intended to include but is not limited to these memories and any memory of another proper type.

It should be further understood that the bus system may further include a power bus, a control bus, a status signal bus, and the like, in addition to a data bus. However, for clarity of description, various buses are marked as the bus system in the figures.

During implementation, each block of the foregoing method may be implemented by using an integrated logic circuit of hardware in the processor or an instruction in a form of software. The blocks of the random access method disclosed with reference to the embodiments of this application may be directly embodied as being executed by a hardware processor, or executed by a combination of hardware of a processor and a software component. The software component may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the blocks in the foregoing method in combination with the hardware of the processor. To avoid repetition, details are not described herein again.

An embodiment of this application further provides a computer readable storage medium. The computer readable storage medium stores one or more programs. The one or more programs include an instruction. When the instruction is executed by a portable electronic device including a plurality of application programs, the portable electronic device can perform the method of the embodiment shown in FIG. 2.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm blocks may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one location, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the blocks of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    sending, by a first network device, a request message to a second network device, wherein the request message comprises a first identifier of a beam of the second network device;
    receiving, by the first network device, a response message responding to the request message from the second network device, wherein the response message comprises first information, wherein the first information comprises a second identifier of the beam and random access resource information associated with the second identifier of the beam, and the first identifier and the second identifier are the same or different identifiers of the beam; and
    sending, by the first network device, the first information to a user equipment (UE), wherein the first information enables the UE to initiate a random access to the second network device.

2. The method according to claim 1, wherein the random access resource information comprises information of a preamble.

3. The method according to claim 2, wherein the information of the preamble comprises a preamble identity.

4. The method according to claim 2, wherein the random access resource information indicates a time resource and/or a frequency resource for transmission of the preamble.

5. The method according to claim 1, wherein sending, by the first network device, the first information to the UE comprises:
    sending, by the first network device, a radio resource control (RRC) message to the UE, wherein the RRC message comprises the first information.

6. The method according to claim 1, wherein the request message further comprises information about a quantity of beam sweeping times of the UE, and the information about the quantity of beam sweeping times is usable to determine a size of a resource indicated by the random access resource information.

7. A method, comprising:
sending, by a first network device, a request message to a second network device, wherein the request message comprises a first identifier of a beam of the second network device;
receiving, by the second network device, the request message;
sending, by the second network device, a response message responding to the request message, wherein the response message comprises first information, the first information comprises a second identifier of the beam and random access resource information associated with the identifier of the beam, and the first identifier and the second identifier are the same or different identifiers of the beam;
receiving, by the first network device, the response message; and
sending, by the first network device, the first information to a user equipment (UE), wherein the first information enables the UE to initiate a random access to the second network device.

8. The method according to claim 7, wherein the random access resource information comprises information of a preamble.

9. The method according to claim 8, wherein the information of the preamble comprises a preamble identity.

10. The method according to claim 8, wherein the random access resource information indicates a time resource and/or a frequency resource for transmission of the preamble.

11. The method according to claim 7, wherein sending, by the first network device, the first information comprises:
sending, by the first network device, a radio resource control (RRC) message to the UE, wherein the RRC message comprises the first information.

12. The method according to claim 7, wherein the request message further comprises information about a quantity of beam sweeping times of the UE, and the information about the quantity of beam sweeping times is usable to determine a size of a resource indicated by the random access resource information.

13. The method according to claim 7, further comprising:
receiving, by the UE, the first information from the first network device.

14. A communications apparatus for a first network device, comprising:
a memory; and
a processor;
wherein the memory is configured to store a computer program instruction, and when the computer program instruction is run on the processor, the computer program instruction causes the apparatus to perform the following:
sending a request message to a second network device, wherein the request message comprises a first identifier of a beam of the second network device;
receiving a response message responding to the request message from the second network device, wherein the response message comprises first information, wherein the first information comprises a second identifier of the beam and random access resource information associated with the second identifier of the beam, and the first identifier and the second identifier are the same or different identifiers of the beam; and
sending the first information to a user equipment (UE), wherein the first information enables the UE to initiate a random access to the second network device.

15. The apparatus according to claim 14, wherein the random access resource information comprises information of a preamble.

16. The apparatus according to claim 15, wherein the information of the preamble comprises a preamble identity.

17. The apparatus according to claim 15, wherein the random access resource information indicates a time resource and/or a frequency resource for transmission of the preamble.

18. The apparatus according to claim 14, wherein sending the first information to the UE comprises:
sending a radio resource control (RRC) message to the UE, wherein the RRC message comprises the first information.

19. The apparatus according to claim 14, wherein the request message further comprises information about a quantity of beam sweeping times of the UE, and the information about the quantity of beam sweeping times is usable to determine a size of a resource indicated by the random access resource information.

20. A communications apparatus for a second network device, comprising:
a memory; and
a processor;
wherein the memory is configured to store a computer program instruction, and when the computer program instruction is run on the processor, the computer program instruction causes the apparatus to perform the following:
receiving a request message from a first network device, wherein the request message comprises a first identifier of a beam of the second network device;
sending a response message responding to the request message to the first network device, wherein the response message comprises first information, wherein the first information comprises a second identifier of the beam and random access resource information associated with the second identifier of the beam, and the first identifier and the second identifier are the same or different identifiers of the beam.

* * * * *